(12) United States Patent
Haynes et al.

(10) Patent No.: US 10,221,968 B2
(45) Date of Patent: Mar. 5, 2019

(54) PIPE SUPPORT

(71) Applicant: Lake Products Limited, Rosedale, Auckland (NZ)

(72) Inventors: Andrew Leo Haynes, Auckland (NZ); Christopher Charles Morrow, Auckland (NZ); Michael John Sumner, Auckland (NZ)

(73) Assignee: Lake Products Limited, Auckland (NZ)

( * ) Notice: Subject to any disclaimer, the term of this patent is extended or adjusted under 35 U.S.C. 154(b) by 0 days.

(21) Appl. No.: 15/263,866

(22) Filed: Sep. 13, 2016

(65) Prior Publication Data

US 2016/0377200 A1 Dec. 29, 2016

Related U.S. Application Data

(63) Continuation of application No. 14/381,149, filed as application No. PCT/NZ2013/000023 on Feb. 27, 2013, now Pat. No. 9,458,951.

(30) Foreign Application Priority Data

Feb. 27, 2012 (NZ) ........................ 598442

(51) Int. Cl.
*F16L 3/08* (2006.01)
*F16L 3/137* (2006.01)
(Continued)

(52) U.S. Cl.
CPC .............. *F16L 3/137* (2013.01); *F16L 3/12* (2013.01); *F16L 3/123* (2013.01); *F16L 3/1207* (2013.01);
(Continued)

(58) Field of Classification Search
CPC ............ F16L 3/137; F16L 3/12; F16L 3/1207
See application file for complete search history.

(56) References Cited

U.S. PATENT DOCUMENTS

| 3,684,223 A | 8/1972 | Logsdon |
| 3,906,592 A | 9/1975 | Sakasegawa et al. |

(Continued)

FOREIGN PATENT DOCUMENTS

| GB | 2146064 | 4/1985 |
| NZ | 197774 | 2/1984 |
| WO | WO-2010/139421 | 12/2010 |

OTHER PUBLICATIONS

First Examination Report for New Zealand Patent Application No. 630207, dated Sep. 15, 2014, 3 pages.

(Continued)

*Primary Examiner* — Amy J. Sterling
(74) *Attorney, Agent, or Firm* — Foley & Lardner LLP

(57) ABSTRACT

A pipe or like support is molded as a unitary item having a region of concertinaing, serpentine, or otherwise longitudinally variable nature between end regions, for example having a longitudinally extensile linking region extending between at least a pair of the end regions the linking region can be of a concertina or serpentine type configuration. The end regions can both have passageways extending there through in a direction perpendicular to the axis of the pipe or like member to be supported.

28 Claims, 8 Drawing Sheets

(51) Int. Cl.
*F16L 3/12* (2006.01)
*F16L 3/123* (2006.01)
*F16L 3/127* (2006.01)

(52) U.S. Cl.
CPC ............. *F16L 3/127* (2013.01); *F16L 3/1215* (2013.01); *F16L 3/1222* (2013.01)

(56) References Cited

U.S. PATENT DOCUMENTS

| | | |
|---|---|---|
| 4,442,994 A | 4/1984 | Logsdon |
| 5,188,496 A | 2/1993 | Giannuzzi |
| 5,482,234 A | 1/1996 | Lyon |
| 6,152,412 A | 11/2000 | Basickes et al. |
| 6,164,604 A | 12/2000 | Cirino et al. |
| 6,334,277 B1 | 1/2002 | Condino |
| 6,604,715 B2 | 8/2003 | Howe |
| 7,090,173 B2 | 8/2006 | Lussier |
| 8,541,681 B2 | 9/2013 | Eshima et al. |
| 8,616,507 B2 | 12/2013 | Willey |
| 8,759,682 B2 | 6/2014 | Devouge |
| 9,458,951 B2 * | 10/2016 | Haynes ................... F16L 3/137 |
| 2004/0262462 A1 | 12/2004 | Polak et al. |

OTHER PUBLICATIONS

Patent Examination Report No. 1 for Australian Patent Application No. 2013202234, dated Sep. 5, 2014, 4 pages.
Written Opinion regarding International Appl. No. PCT/NZ2013/000023, dated Jul. 4, 2013, 6 pages.

\* cited by examiner

PIPE SUPPORT

CROSS-REFERENCE TO RELATED APPLICATIONS

This application claims the benefit of priority as a continuation of U.S. patent application Ser. No. 14/381,149, filed on Aug. 26, 2014 and titled A Pipe Support, which is a National Stage Application of International Application No. PCT/NZ2013/000023, filed Feb. 27, 2013, which claims priority to New Zealand Application 598442, filed Feb. 27, 2012, which are all incorporated herein by reference in their entireties.

FIELD OF THE INVENTION

The present invention relates to a clip, clamp or other support ("clip") insertable for use with pipes in plumbing applications, but which can have other uses such as with cables and in other electrical applications.

BACKGROUND TO THE INVENTION

Pipes used in plumbing applications come in a variety of types and have differing wall thicknesses depending on the manufacturer, the pressure rating, the material used, the requirements of the particular application and/or the industry involved. Common types of pipes used are, copper, polybutylene or polymers of butylene, pex pipe (white) such as cross-linked polyethylene, PVC (poly vinyl chloride), multi-layer composite aluminium, galvanised metals, stainless steels.

Pipe clips are manufactured for use on pipes of common sizes normally referred to by their approximate inside diameter. Because of the different materials used, wall thicknesses and different pressure ratings, the outside diameter of the pipes will vary depending on the product For example ½ inch pipe may have an outside diameter of 0.57 inches (1.45 cm) to 0.85 inches (2.16 cm). Pipe clips are usually made from a semi flexible plastic or a metal, and such materials allow very little flexibility. Plastic clips often only have one fixing hole, and when fitted only come into contact with two thirds of the pipe. See examples of FIGS. 1A to 1C.

A difficulty with such prior art clips is that the differing wall thickness of the different types of pipes requires the use of different sized clips. Current clips will only accommodate a minimal differential in outside diameter therefore manufacturers need to produce a range of clip sizes (which are commonly colour coded so as to differentiate them) for each common pipe size e.g. half inch.

It is critical that the correct size clip for a specific outside diameter of a pipe be used. If the correct clip is not used, does not fit correctly or does not apply enough pressure to the pipe to restrain its movement, this can lead to common problems with pipes such as "water hammer" (banging noises), creeping sounds of the pipe, excessive movement and pipe damage.

Also, if a clip is over flexed (stretched) it will not return to its usual form and will not be able to be re-used.

The installer should always select and install the correct size clip to keep the pipe in place. However, the installer will need to carry a wide range of clip sizes and types to ensure that the appropriate clip is on hand when needed. Aside from the variation in colour, it can be difficult to distinguish (visually or otherwise) between similar clip sizes. The confusion this causes is time consuming and can result in the wrong sized clip being installed.

It is another problem with existing clips on the market that such clips only have one fixing direction (usually also only one hole, but may have two) which gives them only one or two method(s)/option(s) of attachment to a support surface. This means that the usefulness of a particular clip, even if it is the right size for the pipe to be secured, depends on where it is to be mounted. The installer may, also or alternatively, need to use different or additional products to assist in mounting the clip, e.g. wedge products, and therefore will need to carry a further range of products to this end.

It is therefore an object of the present invention to provide such a support ("clip") which will ensure appropriate support yet confer a leeway on size matching between pipes and the clips; or at least to provide the public with a useful choice.

It is a further or alternative object of the present invention to provide a support ("clip" or range of "clips") that will reduce the number of different sizes and/or types of clip that an installer would need to carry in order to ensure that pipes ranging in diameter from approximately ¼ inch to 5 inch and made from different materials can be secured; or at least to provide the public with a useful choice.

It is a further or alternative object of the present invention to provide a support ("clip") which can be attached or mounted to a support surface in a variety of orientations; or which will go at least some way towards providing the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF THE INVENTION

In a first aspect the invention is a pipe or like support moulded as a unitary item having a region of concertinaing, serpentine or otherwise longitudinally variable nature between end regions.

In a further aspect the invention is a pipe or like support moulded as a unitary item having a longitudinally extensile linking region extending between at least a pair of end regions.

Preferably said linking region is of a concertina or serpentine type configuration.

Preferably the linking region is of concertinaing, serpentine or otherwise longitudinally variable nature between end regions.

Preferably said end regions both have passageways extending there through in a direction perpendicular to the axis of the pipe or like member to be supported.

Preferably one of said passageways defines a channel of diverging cross-section.

Preferably one of said passageways defines a channel of circular cross-section.

Preferably said passageway of circular cross-section is threaded or able to be thread engaging.

Preferably said pipe or like support has one or more fixing holes which extend through either or both of the end regions in a direction parallel to the axis of the pipe or like member to be supported.

Preferably there is at least one of said fixing holes in each end region.

Preferably at least one end region has two of said fixing holes.

Preferably said pipe or like support has substantially flat front and rear faces which are parallel to each other.

Preferably said pipe or like support is able to be fixed to a support surface in an orientation wherein its front and rear surfaces are in a plane parallel to that of the supporting surface and is also able to be fixed to a support surface in an orientation wherein its front and rear surfaces are in a plane perpendicular to that of the supporting surface.

Preferably said linking region is of a concertina or serpentine type configuration.

Preferably, the linking region comprises one or more sections or segments which are expandable or extensile. More preferably, said sections or segments expand upon application of a force by a user.

Preferably, the linking region extends substantially the entirety of the length between the end regions. Alternatively, the link region comprises one or more sections or segments of the length between the end regions.

With respect to the above aspects, preferably the linking region is of a concertina or serpentine type configuration.

With respect to the above aspects, preferably the one of said end regions is comprises a first end region and the other of said end regions comprises a second end region, said first end region comprising a threaded or thread engageable passageway, said second end region comprising a passageway for the insertion of a fastener that is to thread engage in the passageway of the first end region, and wherein said linking region is a flexible and extensile region linking said first and second end regions, wherein the flexible and extensile region enables the end regions to be brought into mutual proximity for inter-engagement thus forming a substantially circular inner support surface for support of a pipe or the like, and variation in the diameter of the substantially circular inner support surface by way of extension and contraction in the circumferential direction.

With respect to the above aspects, preferably one of said end regions comprises a first end region and the other of said end regions comprises a second end region, said first end region comprising an upper face, a lower face, and a passageway extending through the region between said upper and lower faces, and said second end region comprising an upper face, a lower face, and a passageway extending through the region between the upper and lower faces, and said linking region is an arcuate linking region connecting the first and second regions, wherein said support has a closed condition wherein said first and second end regions are brought into mutual proximity so that the lower face of the first end region and the upper face of the second end region butt against each other, and an open condition wherein said first and second end regions are a distance apart and wherein the lower face of the first end region and the upper face of the second end region are not in contact and are at an angle to each other, and wherein the passageway extending through the first end region and the passageway extending through the second end region share a common axis regardless of whether the support is in the closed or the open condition.

With respect to the above aspects, preferably the support has an inner surface which surrounds a pipe or the like's girth or outer perimeter or circumference.

With respect to the above aspects, preferably once in-situ the support surrounds the pipe or the like girth, and is able to be anchored, said support being a moulded member defining a cradle region for said girth or outer perimeter or circumference of the pipe or like to be supported, and a co-acting region, said co-acting region for said girth, the co-acting region being able to be brought to bear on the girth or outer perimeter or circumference with some conformation or conformation and extension of its as-moulded form, and at least one or more anchorable zones whereby the interrelationship of the cradle region and the co-acting region will be maintained.

With respect to the above aspects, preferably there is further provided a method of securing a pipe or the like to a support surface comprising the steps of providing a pipe or the like support device having at least two end regions joined by a linking region, said linking region being of a profile allowing for longitudinal extension in a concertina type fashion and being initially in a relaxed or contracted state, positioning the pipe or the like to be secured so as to be partially encircled by the linking region, bringing said at least two end regions into mutual proximity so as to cause the extension of the linking region around the outer diameter of the pipe, applying a fastener such that said fastener is able to simultaneously retain the proximity of said end regions and thus the extension of the linking region about the pipe, and affix the pipe or the like support device to a support surface.

In a further aspect the invention is a pipe or like support comprising or including:

a first end region having a threaded or thread engageable passageway;

a second end region having a passageway for the insertion of a fastener that is to thread engage in the passageway of the first end region; and a flexible and extensile region linking the first and second end regions;

the arrangement being characterised in that the flexible and extensile region enables the end regions to be brought into mutual proximity for inter-engagement thus forming a substantially circular support surface; and variation in the diameter of the substantially circular support surface by way of extension and contraction in the circumferential direction.

Preferably said end regions both have passageways extending there through in a direction perpendicular to the axis of the pipe or like member to be supported.

Preferably one of said passageways defines a channel of diverging cross-section.

Preferably one of said passageways defines a channel of circular cross-section.

Preferably said passageway of circular cross-section is threaded or able to be thread engaging.

Preferably said pipe or like support has one or more fixing holes which extend through either or both of the end regions in a direction parallel to the axis of the pipe or like member to be supported.

Preferably there is at least one of said fixing holes in each end region.

Preferably at least one end region has two of said fixing holes.

Preferably said pipe or like support has substantially flat front and rear faces which are parallel to each other.

Preferably said pipe or like support is able to be fixed to a support surface in an orientation wherein its front and rear surfaces are in a plane parallel to that of the supporting surface and is also able to be fixed to a support surface in an orientation wherein its front and rear surfaces are in a plane perpendicular to that of the supporting surface.

In a further aspect the invention is a pipe or like retainer or support comprising or including:

a first end region, having an upper face, a lower face, and a passageway extending through the region between the upper and lower faces; and a second end region having an upper face, a lower face, and a passageway extending through the region between the upper and lower faces; and an arcuate linking region which connects the first and second regions;

wherein said support has a closed condition wherein said first and second end regions are brought into mutual proximity so that the lower face of the first end region and the upper face of the second end region butt against each other, and an open condition wherein said first and second end regions are a distance apart and wherein the lower face of the first end region and the upper face of the second end region are not in contact and are at an angle to each other;

and wherein the passageway extending through the first end region and the passageway extending through the second end region share a common axis regardless of whether the support is in the closed or the open condition.

Preferably at least one of said passageways is threaded or able to be thread engaging.

Preferably said pipe or like support has one or more fixing holes which extend through either or both of the end regions in a direction parallel to the axis of the pipe or like member to be supported.

Preferably there is at least one of said fixing holes in each end region.

Preferably at least one end region has two of said fixing holes.

Preferably said pipe or like support has substantially flat front and rear faces which are parallel to each other.

Preferably said pipe or like support is able to be fixed to a support surface in an orientation wherein its front and rear surfaces are in a plane parallel to that of the supporting surface and is also able to be fixed to a support surface in an orientation wherein its front and rear surfaces are in a plane perpendicular to that of the supporting surface.

In a further aspect the invention is a pipe or like support able to surround the pipe's or the like's girth, and able itself to be anchored by some means, said support being a moulded member defining a cradle region for said girth; and a co-acting region a co-acting region for said girth, the co-acting region being able to be brought to bear on the girth with some conformation or conformation and extension of its as-moulded form; and at least one or more anchorable zones whereby the interrelationship of the cradle region and the co-acting region will be maintained.

Preferably said end regions both have passageways extending there through in a direction perpendicular to the axis of the pipe or like member to be supported.

Preferably one of said passageways defines a channel of diverging cross-section.

Preferably one of said passageways defines a channel of circular cross-section.

Preferably said passageway of circular cross-section is threaded or able to be thread engaging.

Preferably said pipe or like support has one or more fixing holes which extend through either or both of the end regions in a direction parallel to the axis of the pipe or like member to be supported.

Preferably there is at least one of said fixing holes in each end region.

Preferably at least one end region has two of said fixing holes.

Preferably said pipe or like support has substantially flat front and rear faces which are parallel to each other.

Preferably said pipe or like support is able to be fixed to a support surface in an orientation wherein its front and rear surfaces are in a plane parallel to that of the supporting surface and is also able to be fixed to a support surface in an orientation wherein its front and rear surfaces are in a plane perpendicular to that of the supporting surface.

In a further aspect the invention is a method of securing a pipe to a support surface comprising the steps of:

providing a pipe retaining device having two end regions joined by a linking region, said region being of a profile allowing for longitudinal extension in a concertina type fashion and being initially in a relaxed or contracted state;

positioning the pipe to be secured so that it is partially encircled by the linking region;

bringing the two end regions into mutual proximity so as to cause the extension of the linking region around the outer diameter of the pipe;

applying a fastener such that it is able to simultaneously retain the proximity of the end regions and thus the extension of the linking region about the pipe; and affix the pipe retaining device to the support surface.

In a further aspect the invention is a pipe or like support substantially as herein described with reference to the accompanying drawings.

In a further aspect the invention is the use of a pipe or like support as described herein in any of its aspect to secure or support a pipe or the like.

As used herein the term "and/or" means "and" or "or", or both.

As used herein the term "(s)" following a noun includes, as might be appropriate, the singular or plural forms of that noun.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

The term "pipe" as used herein includes pipes, conduits, cables, rods and other substantially cylindrical members.

The invention consists in the foregoing and also envisages constructions of which the following gives examples only.

BRIEF DESCRIPTION OF THE DRAWINGS

Preferred embodiments of the present invention will now be described with reference to the accompanying drawings in which:

FIG. 9 shows a variety of different ways the clip can be anchored to support in order to properly clamp for support a pipe, conduit, cable or the like.

DETAILED DESCRIPTION OF PREFERRED EMBODIMENTS

The purpose of the invention is to adequately support a pipe and prevent it from moving irrespective of the wall thickness or outside diameter of a pipe which falls within the diameter range tolerance of the clip. The clip is suitable for pipes but could also be used in other applications, for example in securing cables or solid rod.

In smaller diameter pipes or cables e.g. those up to 50 mm the clip tolerance would typically need to be 2-3 mm while, with respect to larger diameter pipes e.g. those over 50 mm, the tolerance would typically need to be up to 5 mm. The range of pipe or cable diameters that would preferably be covered by the invention would be 2 mm, 4 mm, 6 mm, 8 mm, 10 mm, 12 mm, 15 mm, 20 mm, 25 mm, 32 mm, 40 mm, 50 mm, 65 mm, 80 mm, 100 mm, 125 mm, 150 mm, 200 mm, 250 mm and 300 mm.

Figure 1A:
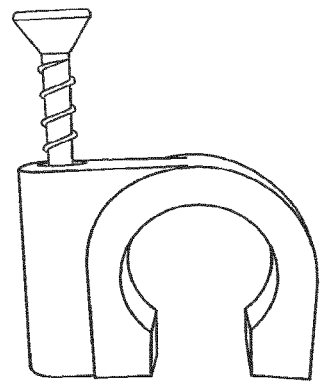
FIGS. 1A, 1B and 1C show some examples of existing pipe clips.
Figure 1B:
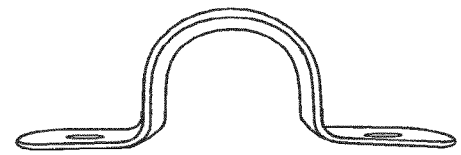
Figure 1C:
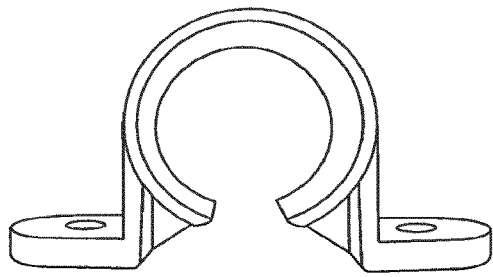
Figure 2:
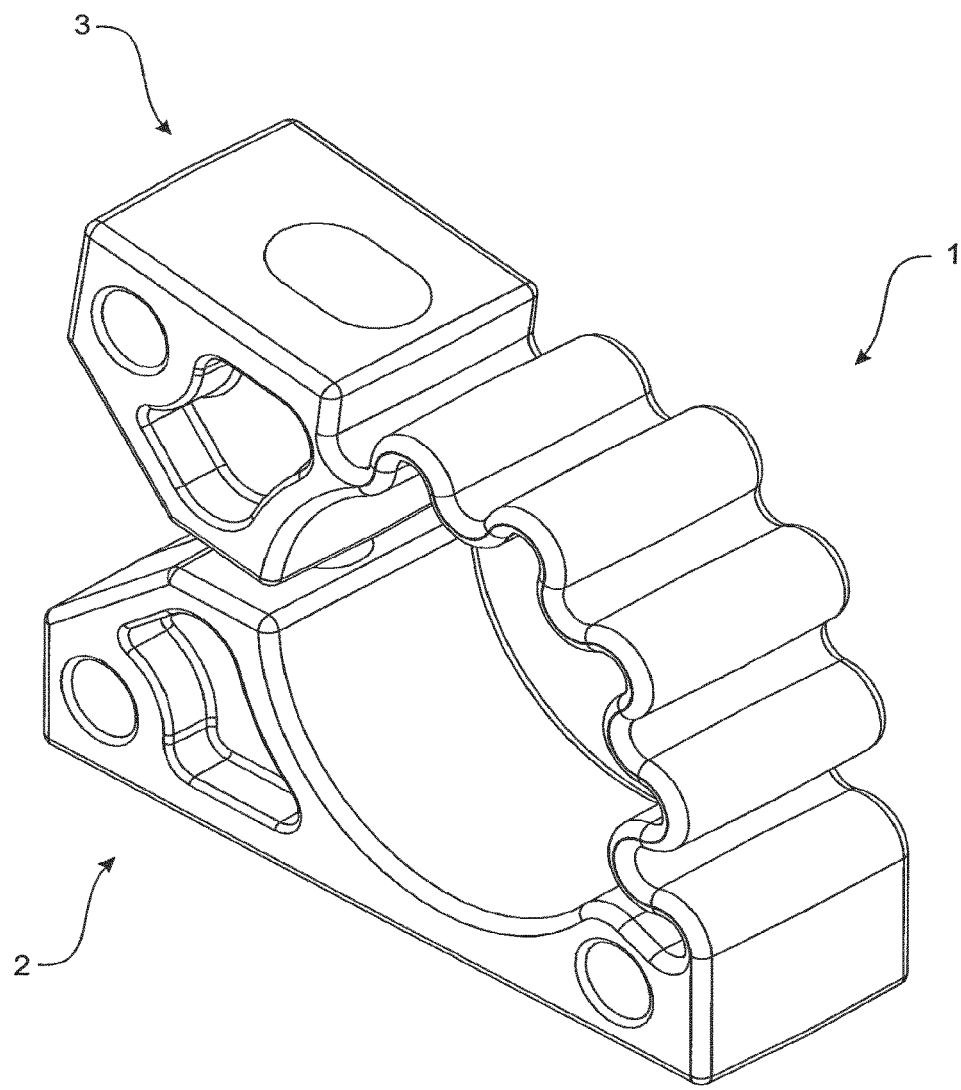
FIG. 2 is an isometric view of the clip in accordance with the present invention.
Figure 3A:
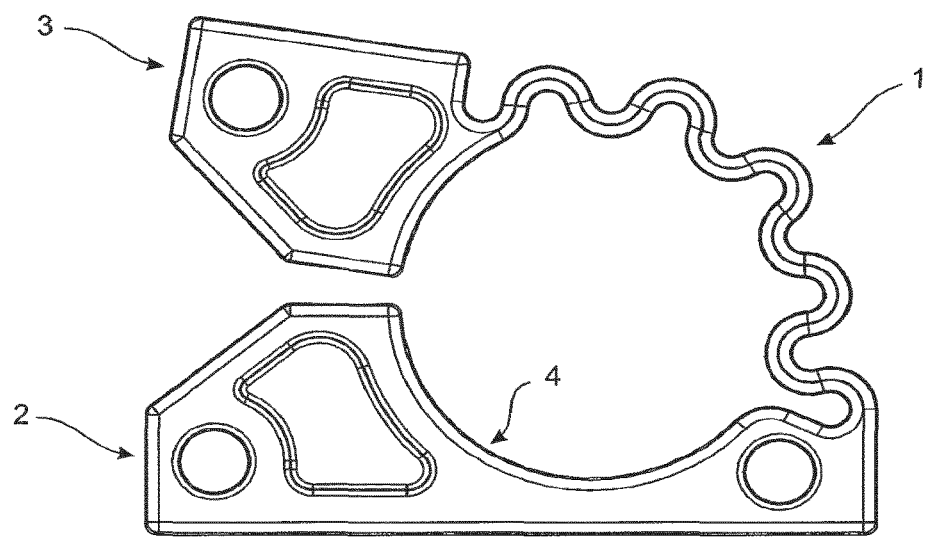
FIG. 3A is a side elevation view of the clip of FIG. 2, showing the clip in its relaxed or open condition.
Figure 3B:
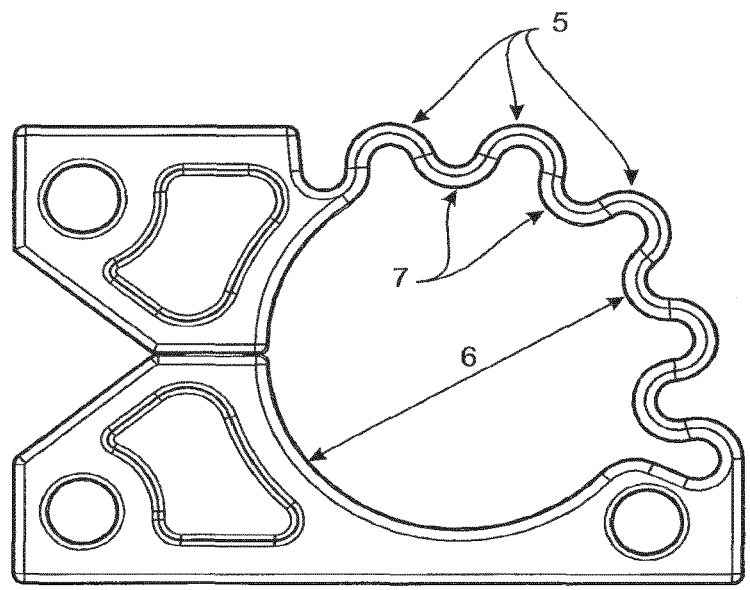
FIG. 3B is a side elevation view of the clip of FIG. 2, showing the clip in its closed condition.

As shown in FIG. 2 the support as a clip has an longitudinally extensile or linking region 1 which substantially encircles the pipe to be secured, and first and second end regions 2 and 3, which when in the open position relative to one another (as shown in FIG. 3A) allow the pipe to be positioned within the extensile or linking region, but when in the closed position relative to one another (as shown in FIG. 3B), have the effect of bringing the extensile or linking region of the support as a clip into firm contact around the outer surface of the pipe.

Preferably one of the end regions 2 is larger than the other end region 3 and provides a contact surface or cradle 4 around part of the inner diameter of the clip.

The extensile or linking region 1 is preferably arc shaped. Preferably when in an un- or non-deformed or unextended state its curve follows a substantially circumferential path. However the linking region can be flexible and can be deformed or extended (i.e. is extensile) by movement of the end regions away from and/or toward each other to allow for opening and closing of the support (i.e. clip). In this manner, the support is longitudinally extensile The extensile or linking region 1 may also be flexible and extendable in the circumferential direction (i.e. is longitudinally extensile), which enables it to be stretched or extended to fit around pipe types of the same generic size (e.g. ½ inch and ¾ inch), regardless of the wall thickness of the pipe. In a preferred embodiment the extension is achieved by a series of ribs 5 able to expand in a concertina type fashion in order to increase the inside diameter 6 of the clip. Although flexible, the ribs are strong enough to maintain an adequate contact force against the outside diameter of the pipe to restrict pipe movement.

Figure 3C:
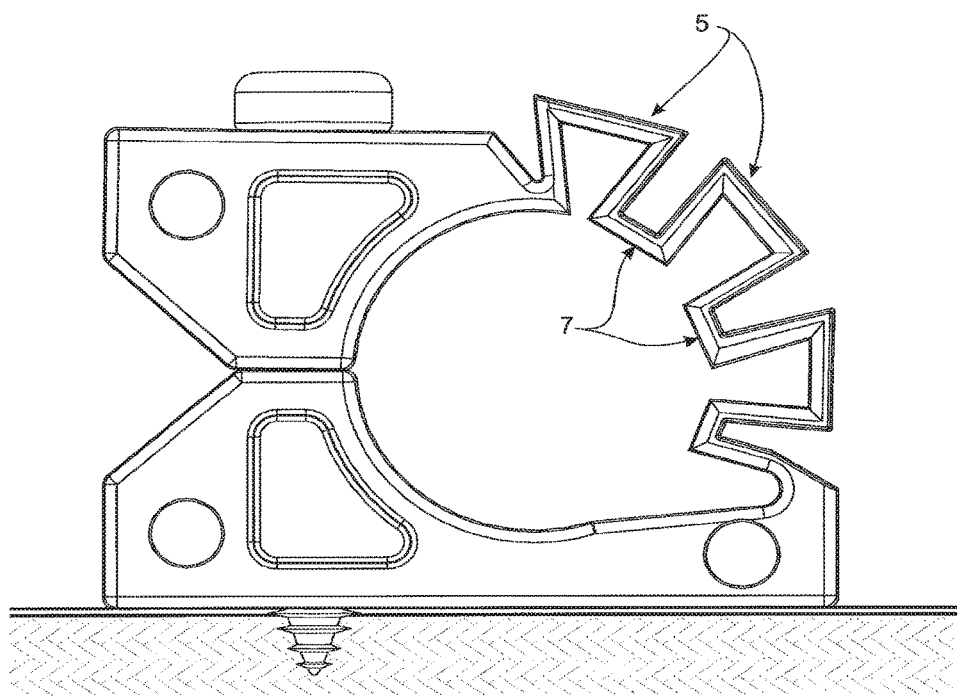
FIG. 3C is a side elevation view of a different embodiment of the clip of FIG. 2, having ribs configured in an alternating triangle shaped concertina, showing the clip in its closed condition, with a fastener or screw located into a supporting surface.

The ribs may take the form of a series of sinusoidal curves, as shown in FIGS. 3A and 3B, or alternatively may take other forms such as saw-tooth or square-tooth. FIG. 3C shows an embodiment where in the ribs 5 are in an alternating triangular-toothed type concertina arrangement.

The contact surfaces 7 of the ribs may be substantially flattened in order to provide a bearing surface or inner surface of the support (or clip) which bear or butt or mate with the outer surface or perimeter of the pipe or member being supported. The non-flexible bearing portion 4 on the inside diameter of the clip need not be exactly round, but rather may have a slightly elongate curve to accommodate differences in the outer diameters of various pipes. Such a non-flexible bearing portion 4 can also contribute to the inner surface of the support (or clip) which can bear upon or butt or mate with or against the outer surface or perimeter of the pipe or member being supported. Preferably when the support (or clip) is in a closed condition, the support is able to provide substantial support around almost the entire outer circumference or perimeter of the pipe by way of contact on these bearing surfaces.

It is preferred that the clip be made of a lightweight and durable material which is able to accommodate some degree of flexion. Some examples of suitable materials are plastics, polypropylene, polyethylene, PVC (poly vinyl chloride), ABS (acrylonitrile-butadiene-styrene), nylon, acetal polymers, polycarbonates, thermoplastics, polyurethanes or a very ductile metal e.g. soft temper aluminium. The ability of the extensile region to expand and contract elastically, in combination with the cross-sectional thickness used and the choice of a suitable material, results in a pipe support (or clip) which cannot be over flexed and which will pull back into more or less its original shape after being opened up or stretched. This means that the clip will not be permanently deformed if it is accidentally over-stretched while the support is positioned on a pipe being installed, and that it is also unlikely to tear or break during this process. An additional benefit is that the same support (clip) can be re-used if necessary.

Figure 4:
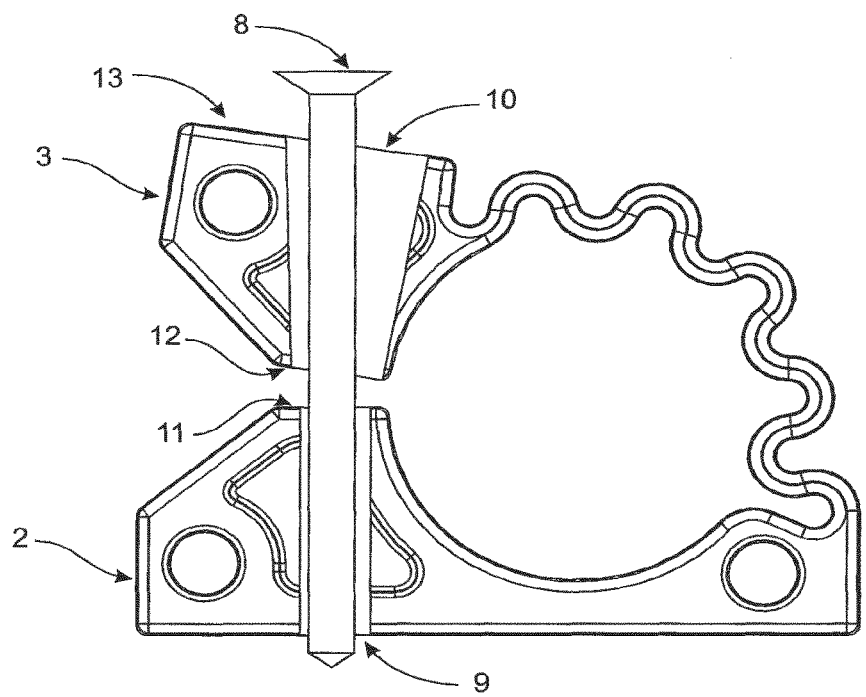
FIG. 4 is a sectional view showing the interrelationship of the passageways and their relationship to fixing holes, also with a fastener or screw or other affixation generally in-situ.

In order to secure the clip in a closed position, the two end regions of the clip 2 and 3 must be brought together, and may subsequently be inter-engaged to hold the clip closed around the pipe. There are a numbers of ways that the end regions could be inter-engaged, however a preferable way of achieving this is by way of a common fastener 8 to be passed through a passageway 9 in the first end region 2 and also through a passageway 10 in the second region 3 as shown in FIG. 4. The end regions may have flat joining faces 11 and 12 which are then brought to butt against each other as the clip is closed. It may be that the joining faces 11 and 12 do not completely abut, however they will at least tend toward abutment as the clip is tightened around the pipe.

Figure 5:
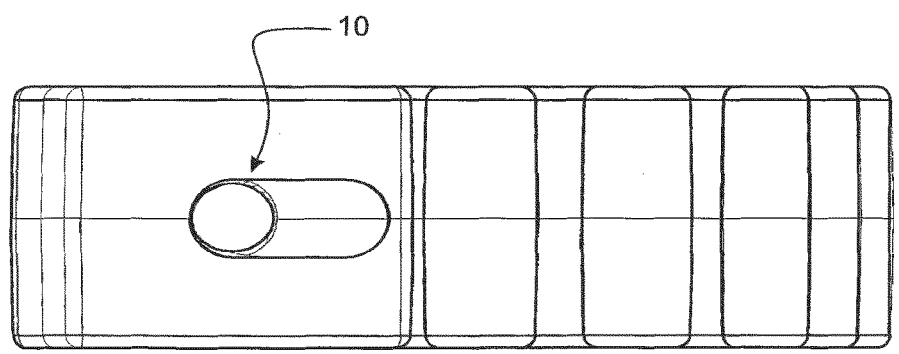
FIG. 5 is a top elevation view of the clip of FIG. 2.

The passageway 10 in the end region 3 may be a diverging channel as shown in cross-section in FIG. 4. To create an appropriately shaped channel the profile of the passageway as it opens to the joining face 12 should be circular, whilst the profile at the end of the passageway which opens to the upper face 13 of the end region 3 should be substantially oval. This enables the fastener 8 to correctly align into the circular passageway 9 in the end region 2 of the clip while the joining faces of the clip 11 and 12 are still at a distance to each other, i.e. the clip is in an open or semi-open position, and retains the fastener 8 in place as the clip is closed to its final position. The alignment of the passageways 9 and 10 in the open position can be seen from the top view of the clip shown in FIG. 5.

Figure 6A:
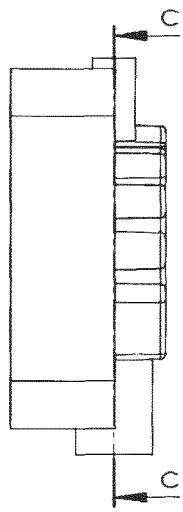
FIGS. 6A, 6B and 6C are cavity drawings showing the core pin clamp, with 6C being the Section C-C.
Figure 6B:
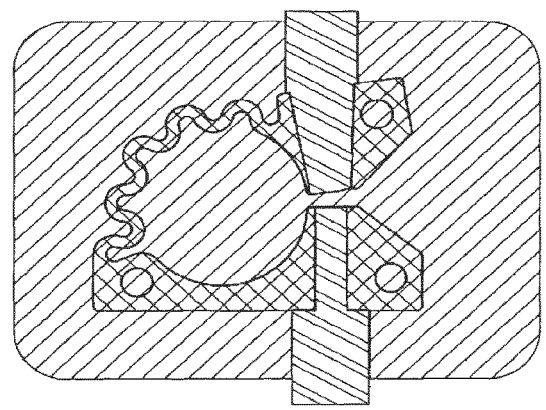
Figure 6C:
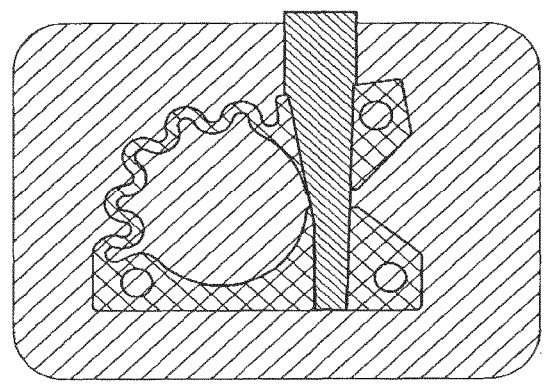

The embodiment of the clip having a diverging channel, as shown in FIG. 4 also has advantages in terms of ease of manufacture because the clip must be formed in its relaxed, and therefore open, state. The axis of the passageway needs to be substantially normal to the plane of the joining face, however it may also be necessary to create the passageways in-mould while the joining faces are at an angle relative to each other. A metal core, or cores, can be used to make the passageways 9 and 10. This core follows the shape of the passageways 9 and 10 as per FIGS. 6A, 6B and 6C of the drawings and allows the manufacture of the holes to be aligned where the joining faces are not parallel to each other.

Figure 7:
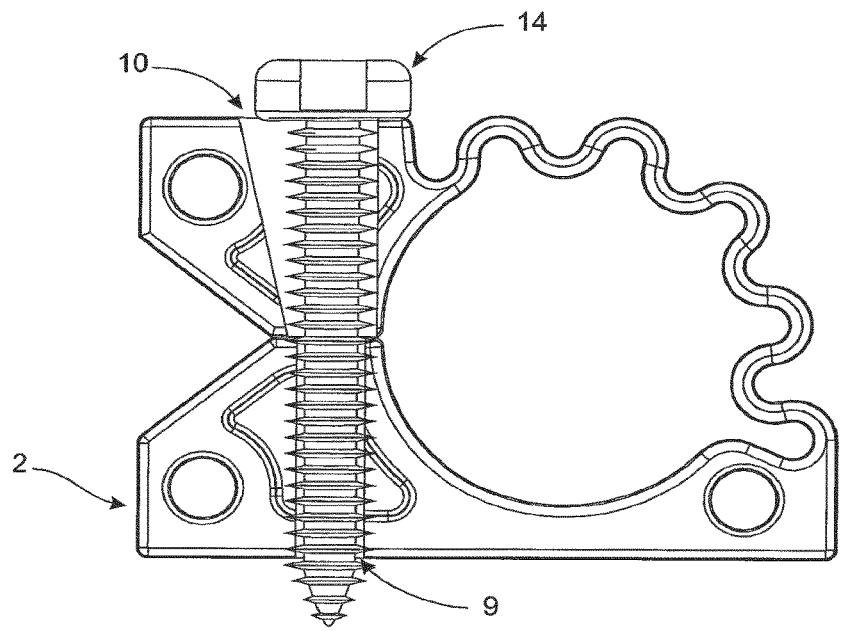
FIG. 7 is a similar view to that of FIG. 4 showing the change in alignment of the end regions when fully closed.

In some embodiments of the invention the inter-engagement is secured by way of a thread engaging fastener 14 as shown in FIG. 7.

In one preferment said fastener is a self-tapping style screw. The passageway 9 in the end region 2 of the clip is a round hole or aperture with an interference fit, i.e. it is able to be "tapped" by the screw, while the passageway in the top half of the clip 10 is a non-interference or sliding fit.

Figure 8:
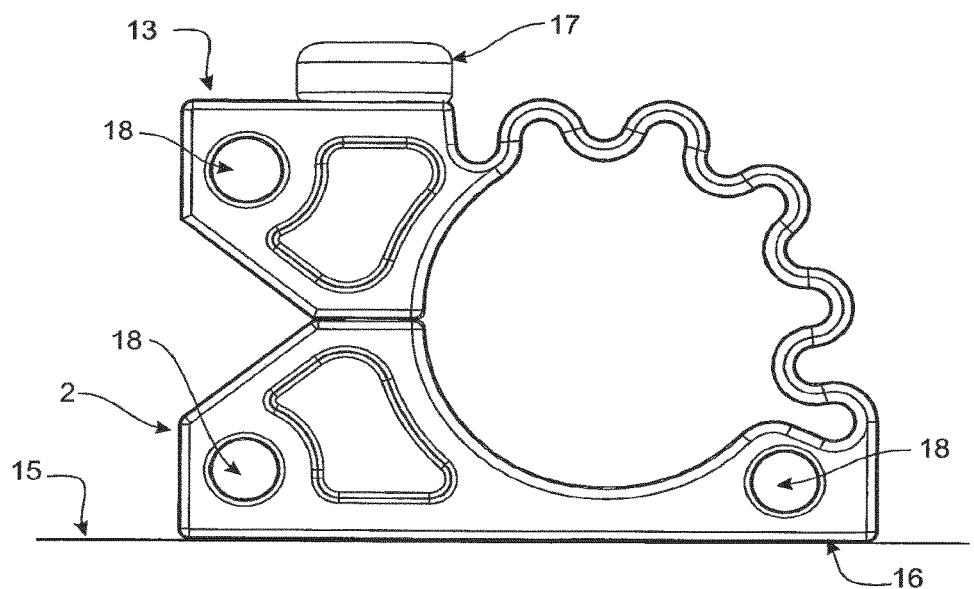
FIG. 8 shows the clip of FIG. 7 affixed to a supporting surface (fastener not shown as it is embedded in supporting surface).

However, as well as securing the clip in the closed position, the fastener can simultaneously serve to affix the clip to a support surface 15 as shown in FIG. 8. This will obviously be more successful if the design of the clip provides a significant flat base surface 16 on the end region 2. In this situation is not essential that the fastener 17 be thread engaging. For example, a simple nail could be driven through the passageways 9 and 10, and into the support surface 15 to affix the clip. Providing that the head of the nail is large enough, it will still act upon the top surface 13 of the first region 3 in order to close the clip around the pipe.

One or more additional fixing holes 18 for fixing to a support surface may be provided. Preferably such holes are in an orientation whereby their axes are parallel with the axis along which the pipe would be positioned. A preferable arrangement of three fixing holes is shown in FIG. 8, although it will not always be necessary to employ all three at once. These fixing holes 18 could also be used a fixing or fastening points for cables or ties.

Figure 9:
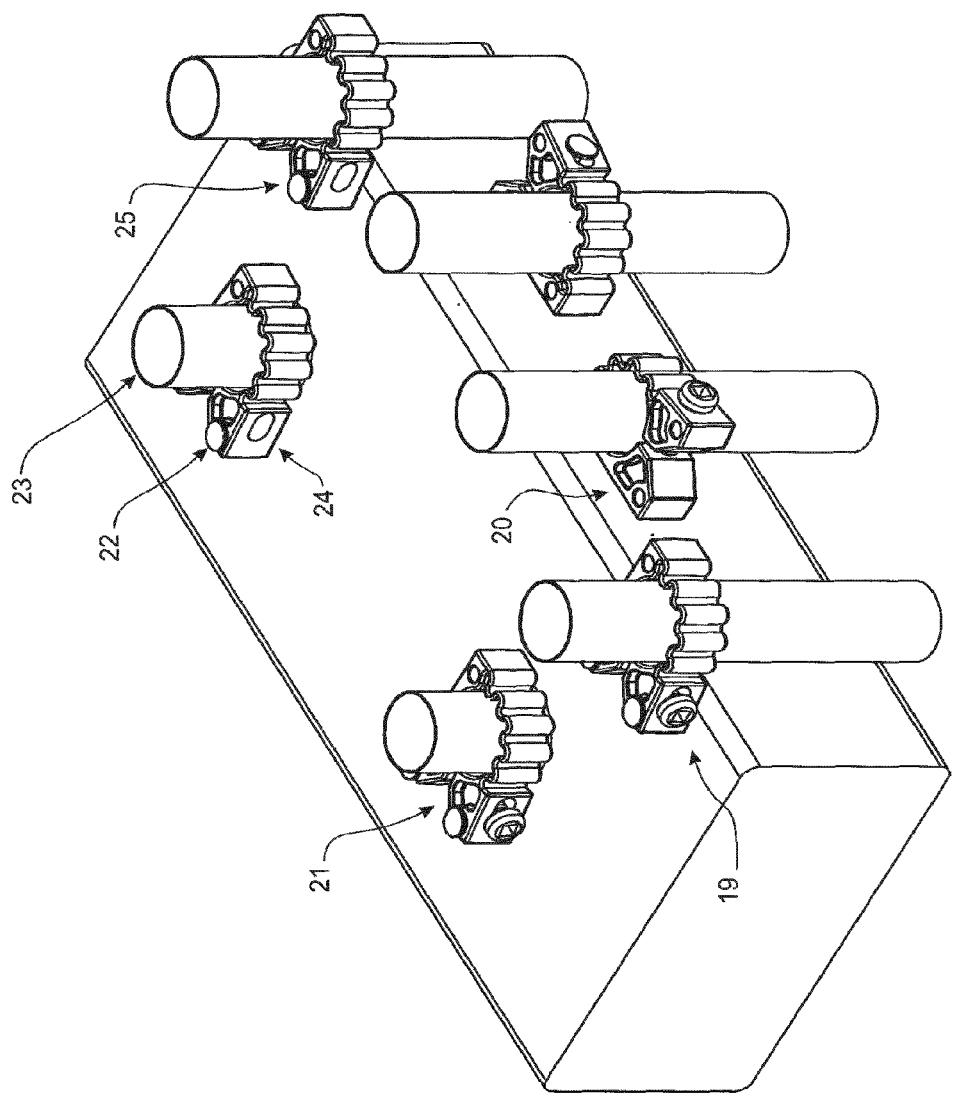

Preferably the arrangement of the fixing holes will allow the clip to be affixed in a variety of ways as shown in FIG. 9; namely to suspend the pipe from an edge of the support surface as shown at 19, to stand the pipe off from the support surface as shown at 20, or to support a pipe passing through a bore hole made in the support surface as shown at 21. The ability to provide all of these mounting options makes the clip versatile and easy to install.

It can be seen that a fastener to bring the two end regions 2 and 3 into proximity with each other may not be necessary depending on how the clip is orientated in respect to the support surface. For example, it may be possible to use two fixing screws 22 and 23 to simultaneously fix the clip to the support surface and hold the clip closed around the pipe, as shown at 24 and 25.

The support (or clip) may be formed from two materials via, for example, injection moulding, with the linking region being made of a relatively softer material and the end regions being made of a relatively harder or stiffer material.

It will be appreciated the support of this invention is preferably formed or moulded as a unitary member. The support can be a single piece of moulded polymeric material.

The moulding or forming of the support as a unitary member can provide various advantages. For example, a single part can be held by a user, applied about the pipe or the like to be supported (often can be done single handed by the user), the support can be extended or deformed into its extended longitudinal configuration or arrangement enabling the support to surround the pipe or the like. Once the support is encircling of the pipe of the like, the support's inner surface is substantially in contact or abutting or mating with the pipe or the like's outer perimeter or surface. The user can then apply a fastener or other fixation to secure the support in position and onto a supporting surface.

Advantageously, the support of this invention enables for a variety of different diameter or circumference/perimeter pipes of the like to be gripped and supported by the support. The linking region is longitudinally extensile so effectively enable a longer length of the support and its inner surface to surround or encircle the pipe of the like.

Suitable materials include polymers of sufficient strength so as to be capable of adequately supporting and/or retaining a pipe or the like in a desired position once the support is affixed to a support surface. Suitable materials characteristics yet further include those materials providing the above strength behaviour, yet capable of enabling the longitudinal extensile linking region to extend and/or contract as desired. In this manner, a material having a shape "memory" can be useful.

The foregoing description of the invention includes preferred forms thereof. Modifications may be made thereto without departing from the scope of the invention.

What is claimed is:

1. A pipe support, said support moulded as a unitary item comprising:
   a longitudinally extensile linking region extending between at least a pair of end regions;
   wherein the at least a pair of end regions contact at least a part of the perimeter of a pipe to be supported; and
   wherein the longitudinally extensible linking region comprises a concertina or serpentine profile with an inner surface to face the pipe to be supported, the inner surface of the longitudinally extensible region comprising:
      a plurality of bearing portions, each bearing portion having a contact surface to contact at least part of the perimeter of the pipe to be supported, and
      a plurality of non-bearing portions, each non-bearing portion substantially free of contact with the perimeter of the pipe to be supported and linking adjacent bearing portions of the longitudinally extensible linking region.

2. The support as claimed in claim 1, wherein said end regions comprise passageways extending therethrough in a direction perpendicular to the axis of the pipe to be supported.

3. The support as claimed in claim 2, wherein one of said passageways defines a channel of diverging cross-section.

4. The support as claimed in claim 2, wherein one of said passageways defines a channel of substantially constant cross-section.

5. The support as claimed in claim 1, wherein said support comprises one or more fixing holes which extend through either or both of said end regions in a direction parallel to the axis of the pipe to be supported.

6. The support as claimed in claim 5, wherein at least one of said fixing holes is in each said end region.

7. The support as claimed in claim 5, wherein at least one of said end regions comprises two of said fixing holes.

8. The support as claimed in claim 1, wherein said support has substantially flat front and rear faces which are parallel to each other.

9. The support as claimed in claim 1, wherein said support is able to be fixed to a support surface in an orientation wherein front and rear surfaces of said support are in a plane parallel to a supporting surface, and wherein said support is also able to be fixed to said support surface in an orientation wherein front and rear surfaces of said support are in a plane perpendicular to that of said supporting surface.

10. The support as claimed in claim 1, wherein the longitudinally extensible linking region comprises one or more sections or segments which are expandable or extensile, said sections or segments adapted to expand upon application of a force by a user.

11. The support as claimed in claim 1, wherein the longitudinally extensible linking region extends substantially the entirety of length between the end regions.

12. The support as claimed in claim 1, wherein the longitudinally extensible linking region comprises one or more sections or segments of length between the end regions.

13. The support as claimed in claim 1, wherein one of said end regions comprises a first end region and the other of said end regions comprises a second end region,
  said first end region comprising a threaded or thread engageable passageway,
  said second end region comprising a passageway for the insertion of a fastener that is to thread engage in the passageway of the first end region, and
  wherein said longitudinally extensible linking region is a flexible and extensile region linking said first and second end regions,
  wherein the flexible and extensile region enables said first and second end regions to be brought into mutual proximity for inter-engagement thus forming an arc shaped inner support surface for support of a pipe, and variation in the diameter of the arc shaped inner support surface by way of extension and contraction in the circumferential direction.

14. The support as claimed in claim 1, wherein one of said end regions comprises a first end region and the other of said end regions comprises a second end region,
  said first end region comprising an upper face, a lower face, and a passageway that extends between said upper and lower faces, and
  said second end region comprising an upper face, a lower face, and a passageway that extends between the upper and lower faces, and
  said longitudinally extensible linking region is an arcuate linking region connecting the first and second regions,
  wherein said support has a closed condition wherein said first and second end regions are brought into mutual proximity so that the lower face of the first end region and the upper face of the second end region butt against each other, and an open condition wherein said first and second end regions are a distance apart and wherein the lower face of the first end region and the upper face of the second end region are not in contact and are at an angle to each other, and
  wherein the passageway extending through the first end region and the passageway extending through the second end region share a common passageway for receiving a fastener regardless of whether the support is in the closed or the open condition.

15. The support as claimed in claim 1, wherein said support has an inner surface which surrounds a pipe's girth or outer perimeter or circumference.

16. The support as claimed in claim 1, once in-situ said support surrounds a pipe's girth or outer perimeter or circumference, and is able to be anchored, said support being a moulded member defining:
  a cradle region for said girth or outer perimeter or circumference of the pipe to be supported, and
  longitudinally extensible linking region for said girth or outer perimeter or circumference, the longitudinally extensible linking region being able to be brought to bear on the girth or outer perimeter or circumference with some conformation or conformation and extension of its as-moulded form, and
  one or more anchorable zones whereby the interrelationship of the cradle region and the longitudinally extensible linking region will be maintained.

17. The support as claimed in claim 1,
  wherein a first end region of said first pair of end regions comprises a threaded or thread engageable passageway, and
  a second end region of said pair of end regions comprises a passageway for the insertion of a fastener that is to thread engage in the passageway of the first end region, and
  said flexible and extensile region linking the first and second end regions,
  the longitudinally extensible linking region enabling the pair of end regions to be brought into mutual proximity for inter-engagement thus forming a substantially circular support surface, and variation in the diameter of the substantially circular support surface by way of extension and contraction in the circumferential direction.

18. The support as claimed in claim 1,
  wherein a first end region of said pair of end regions comprises an upper face, a lower face, and a passageway extending through the region between said upper and lower faces, and
  a second end region of said pair of end regions comprises an upper face, a lower face, and a passageway extending through the region between the upper and lower faces, and
  said longitudinally extensible linking region connecting the first and second regions,
  wherein said support has a closed condition wherein said first and second end regions are brought into mutual proximity so that the lower face of the first end region and the upper face of the second end region butt against each other, and an open condition wherein said first and second end regions are a distance apart and wherein the lower face of the first end region and the upper face of the second end region are not in contact and are at an angle to each other;
  and wherein the passageway extending through the first end region and the passageway extending through the second end region provide a common passageway for receiving a fastener regardless of whether the support is in the closed or is in an at least partially open condition.

19. The support as claimed in claim 1, wherein each bearing portion provides for a discrete bearing surface on the inner surface of the longitudinally extensible linking region to butt or mate with the perimeter of the pipe to be supported.

20. The support as claimed in claim 1, wherein the contact surface of the bearing portion is a substantially flattened to provide for a bearing surface on the inner surface of the longitudinally extensible linking region to butt or mate with the perimeter of the pipe to be supported.

21. The support as claimed in claim 12, wherein each of the one or more sections or segments comprises at least part of said inner surface defining said bearing portions and said non-bearing portions.

22. The support as claimed in claim 1, wherein the support further comprises a non-flexible bearing portion, the non-flexible bearing portion is a cradle being on the inside of the clip to bear upon, butt or mate with at least part of the perimeter of the pipe to be supported.

23. The support as claimed in claim 22, wherein each of said end regions comprise at least a portion of said non-flexible bearing portion such that when bought together the end regions define the cradle.

24. The support as claimed in claim 2, wherein one of said passageways defines a channel of substantially circular cross-section.

25. The support as claimed in claim 24, wherein said passageway of substantially circular cross-section is threaded or able to be thread engaging.

26. A method of securing a pipe to a support surface comprising the steps of:
   providing a pipe support comprising a concertina or serpentine profiled extensile linking region extending between at least a pair of end regions, wherein the at least a pair of end regions contact at least a part of the perimeter of the pipe, and wherein the extensible linking region comprises a plurality of bearing portions, each bearing portion having a contact surface to contact at least part of the perimeter of the pipe, and a plurality of non-bearing portions, each non-bearing portion substantially free of contact with the perimeter of the pipe and linking adjacent bearing portions of the extensible linking region,
   positioning the pipe to be secured so as to be partially encircled by the longitudinally extensible linking region,
   bringing said pair of end regions into mutual proximity so as to cause the extension of the linking region around the outer diameter of the pipe, and
   applying a fastener such that said fastener is able to simultaneously retain the proximity of said end regions and thus the extension of the longitudinally extensible linking region about the pipe, and affix the pipe support device to a support surface.

27. A pipe support, said support moulded as a unitary item comprising:
   a longitudinally extensile linking region extending between at least a pair of end regions;
   wherein the at least a pair of end regions butt or mate with at least a part of the perimeter of a pipe to be supported; and
   wherein the longitudinally extensible linking region comprises a concertina or serpentine profile with an inner surface to face the pipe to be supported, the inner surface of the longitudinally extensible region comprising:
      a plurality of bearing portions, each bearing portion having a contact surface to butt or mate with at least part of the perimeter of the pipe to be supported, and
      a plurality of non-bearing portions, each non-bearing portion substantially free of contact with the perimeter of the pipe to be supported and linking adjacent bearing portions of the longitudinally extensible linking region;
   wherein each bearing portion provides for a discrete bearing surface on the inner surface of the longitudinally extensible linking region to contact the perimeter of the pipe to be supported.

28. A pipe support, said support moulded as a unitary item comprising:
   a longitudinally extensile linking region extending between at least a pair of end regions;
   wherein the at least a pair of end regions butt or mate with at least a part of the perimeter of a pipe to be supported; and
   wherein the longitudinally extensible linking region comprises a concertina or serpentine profile with an inner surface to face the pipe to be supported, the inner surface of the longitudinally extensible region comprising:
      a plurality of bearing portions, each bearing portion having a contact surface to butt or mate with at least part of the perimeter of the pipe to be supported, and
      a plurality of non-bearing portions, each non-bearing portion substantially free of contact with the perimeter of the pipe to be supported and linking adjacent bearing portions of the longitudinally extensible linking region;
   wherein the support further comprises a non-flexible bearing portion, the non-flexible bearing portion forming a cradle on the inside of the clip to contact at least part of the perimeter of the pipe to be supported.

* * * * *